United States Patent Office 3,446,599
Patented May 27, 1969

3,446,599
METHOD AND COMPOSITION FOR THE DETECTION OF UROBILINOGEN IN FLUIDS
Aeneas J. Shand, Enfield, England, assignor to Miles Laboratories Incorporated, Elkhart, Ind., a corporation of Indiana
No Drawing. Filed Mar. 3, 1967, Ser. No. 620,228
Claims priority, application Great Britain, Mar. 11, 1966, 10,861/66
Int. Cl. G01n 31/00
U.S. Cl. 23—230    20 Claims

ABSTRACT OF THE DISCLOSURE

Method and composition for use in the detection of urobilinogen and mesobilirubinogen in an aqueous fluid utilizing a two component reagent system, i.e., (1) a mixture of para-di(lower alkyl)aminobenzaldehyde and an acid, which mixture forms a colored complex with the above noted compounds and (2) a solid substance which decomposes on contact with the mixture obtained by adding (1) to the aqueous fluid being tested to produce a solvent for the colored complex, said solvent having a density different from that of the aqueous fluid as well as being substantially immiscible therewith and thus being effective to extract the colored complex and remove the same from other interfering colored substances in the fluid being tested.

---

The term "urobilinogen" is used hereinafter (except where the content otherwise requires) to refer both to urobilinogen itself and also to mesobilirubinogen.

Urobilinogen occurs in the plasma and urine of patients suffering from certain pathological conditions, and it is consequently of interest for the clinician and general practitioner to be able to detect the presence of urobilinogen in aqueous liquids containing the same in a manner which can be simply and rapidly carried out.

It is known to detect urobilinogen by reaction with Ehrlich's reagent (para-dimethylaminobenzaldehyde) in the presence of acid, a rose colored substance being formed, and it is also known to improve the specificity of this reaction by extracting the colored substance from the aqueous liquid with a solvent such as chloroform. This extraction differentiates colored substances formed from urobilinogen from those formed from other substances which may be present in the serum or urine. This method is not, however, well suited for routine use away from a properly equipped laboratory because it involves the use of liquid reagents.

This invention provides a method for detecting the presence or urobilinogen in an aqueous fluid containing the same using only solid reagents but having the advantages of prior art methods involving the extraction of the colored substance with a liquid organic solvent. The invention also provides compositions for use in the aforesaid method.

According to the present invention, a method for the detection of urobilinogen in an aqueous liquid containing the same comprises adding to the said liquid: (1) para-di(lower alkyl)aminobenzaldehyde and a solid, inert acid (i.e., an acid which does not interfere with the color-forming reaction); and adding to the mixture obtained (2) a solid substance (or mixture of substances) which decomposes on contact with the mixture obtained by adding (1) to the aqueous fluid being tested to produce an inert solvent for any colored substance formed, said solvent having a density different from that of the mixture. The invention includes within its scope a two-component composition for the detection of urobilinogen in an aqueous test fluid comprising the ingredients noted in the method described next above.

In the para-di(lower alkyl)aminobenzaldehyde, the lower alkyl groups each may contain 1 to 4 carbon atoms. The preferred compound is the above mentioned para-dimethylaminobenzaldehyde.

The solid, inert acid added with the para-di(lower alkyl) aminobenzaldehyde to the aqueous test liquid can be, e.g., sulfosalicylic acid, maleic acid, or oxalic acid, or less preferably mesoxalic acid, acetylene di-carboxylic acid, mono-chloromalonic acid, or mono-bromomalonic acid, or a mixture of two or more of these. The acid must be one which does not interfere with the color-producing reaction and for this reason, citric acid, for example, cannot be used.

If desired, a substance to promote dissolution of the reagents may be added with the para-di(lower alkyl) aminobenzaldehyde and acid to the aqueous fluid under test. An example of such a substance, suitable for use when the acid is maleic acid or sulfosalicylic acid, is sodium bicarbonate, the effervescence of which in the presence of acid serves to stir the mixture. It will be understood that where such a substance which reacts with the acid is added, it is necessary to add more of the acid than would otherwise be required to ensure that the mixture ultimately obtained remains acid. Generally, a large excess of the acid with respect to the para-di(lower alkyl) aminobenzaldehyde is used, and ordinarily the weight of acid is from 25 to 50 times the weight of the para-di(lower alkyl)aminobenzaldehyde. The proportion of the para-di (lower alkyl)aminobenzaldehyde and acid reagent added to the aqueous fluid will ordinarily be from 15 to 25% by weight of the test fluid but it is possible to depart from this range of proportions without adversely affecting the result of the test, though the use of larger quantities of this reagent is wasteful, and the use of smaller quantities could lead to incomplete production of the desired colored substance in fluids containing large amounts of urobilinogen.

After the para-di(lower alkyl)aminobenzaldehyde and acid have been added to the test fluids, the mixture is allowed to stand for up to about one minute to allow complete reaction of the para-di(lower alkyl)aminobenzaldehyde with any urobilinogen that may be present. There is no necessity to heat the mixture as the color-producing reaction takes place at room temperature. The mixture can be warmed if necessary to about 40°–60° C. to promote completion of the reaction but this is undesirable as it is liable to lead to the occurrence of unwanted side reactions.

After sufficient time has elapsed to ensure that any urobilinogen present has fully reacted with the para-di(lower alkyl)aminobenzaldehyde, ordinarily about one-half to one minute, there is added to the mixture a solid reagent which liberates an inert solvent for the colored substance on contact with the mixture. The preferred class of such reagents consists of the magnesium and aluminum alkoxides of alkanols, generally containing 4–8 carbon atoms, which alkanols are liquid at room temperature, immiscible or almost immiscible with water, and have a specific gravity less than one. Such alkoxides on reaction with the excess acid present in the aqueous mixture to which they are added liberate the alkanol corresponding to the alkoxide, and the magnesium or aluminum salt, as the case may be, of the acid present in the mixture. The alkanol floats on the surface of the mixture and is rose colored if any urobilinogen was present in the test liquid. Specific examples of suitable alkoxides are aluminum sec-butoxide, aluminum n-hexyloxide, aluminum n-heptyloxide, magnesium n-pentyloxide, magnesium n-hexyloxide, magnesium n-heptyloxide, and their mixtures. The magnesium and aluminum salts of certain of the acids named above, e.g., oxalic and mesoxalic acid, are insoluble in water and are precipitated when the alkanol is liberated. However, this is not disadvantageous as the white color of the precipitate provides a background against which any rose color in the alkanol liberated readily shows up. The proportion of the alkoxide added will ordinarily be from 10–25% by weight of the aqueous mixture in order to ensure that a readily discernible amount of the alkanol is liberated. It will be understood that if the aqueous mixture formed by mixing the test fluid with the para-di(lower alkyl)aminobenzaldehyde and acid contains insufficient acid to neutralize the alkoxide added, it will be necessary to add further acid to ensure that the alkoxide is completely decomposed. The proportion of such additional acid required can, of course, be readily calculated by reference to the amount of acid originally added and the amount of alkoxide which it is desired to add.

A second class of solid reagents which can be added to the aqueous mixture formed by mixing the test fluid with the para-di (lower alkyl) aminobenzaldehyde and the acid consists of the alkali metal and ammonium salts of aliphatic acids which are liquid at room temperature, immiscible or substantially immiscible with water, and of specific gravity less than one. Such acids ordinarily contain from 5–10 carbon atoms. Suitable salts include sodium nonanoate, sodium octanoate and sodium isooctanoate. As with the alkoxide type of reagent, these salts are decomposed by the acid present in the mixture to which they are added with liberation of the liquid aliphatic acid which dissolves any colored substance produced by the reaction of urobilinogen with the para-di (lower alkyl) aminobenzaldehyde, thus enabling any such colored substance to be readily observed. The proportion of such alkanoate is ordinarily the same, with respect to the weight of aqueous mixture to which it is added, as that of the alkoxide already referred to.

The two-component compositions of the invention comprise, as already stated, (1) a solid mixture of para-di (lower alkyl) aminobenzaldehyde and a solid, inert acid and (2) a substance (or mixture of substances) which, in the presence of the mixture of aqueous test fluid and component (1), liberates an inert liquid solvent for any colored substance produced by the reaction of the para-di (lower alkyl) aminobenzaldehyde and any urobilinogen which may be present in the aqueous test fluid, the liquid solvent being lighter in weight than the aqueous mixture. Such compositions may be made up using the reagents already mentioned in proportions such that on successive addition to a predetermined amount of test fluid any colored substance produced is dissolved into the upper layer of the final two-phase system where its presence can be readily observed. In component (1), the relative proportions of para-di ( lower alkyl) aminobenzaldehyde and acid will be generally within the range already given, and the composition may also contain diluents and/or disintegrating agents (e.g., the sodium bicarbonate mentioned above for use with maleic or sulfosalicylic acid) to promote dissolution of the reagents in the aqueous test fluid. Component (2) may, for example, consist solely of the magnesium or aluminum alkoxide or the alkali metal or ammonium alkanoate already mentioned, or it may consist of a mixture of such reagent with additional acid to insure complete decomposition and liberation of the solvent for the colored substance. The weight of the various reagents will be determined having regard to the amount of test fluid to which the two components are designed to be added. Thus, for a test sample of 2 cc., the amount of para-di (lower alkyl) aminobenzaldehyde in component (1) will ordinarily be from 10 to 20 mg., and the weight of solid inert acid from 25 to 50 times this amount. In component (2), for the same volume of test fluid the amount of the alkoxide or alkanoate above mentioned will generally be from 300 to 500 mg. As with component (1), component (2) can be mixed with diluents and/or substances which promote the dissolution of the reagents in the test fluid.

The new test method makes it possible to detect concentrations of urobilinogen as low as 0.3 mg. percent. This is as satisfactory lower limit as normal urine may sometimes contain as much as 0.275 mg. percent, while concentrations greater than this generally have a pathological origin.

The composition of the present invention may be utilized in the form of admixed powders, tablets, capsules containing powders, granules, and so forth, to mention only a few of the many physical forms it can take. The physical appearance and make-up of the composition thus is a matter of convenience and within the discretion of one skilled in the art.

The method and compositions of the invention can be used for the detection of bilirubin by first reducing the latter compound to mesobilirubinogen by chemical means, e.g., sodium amalgam reduction, and then proceeding as above described.

The composition and method of the present invention will be illustrated by the following examples but it is not to be limited thereby. In these examples mesobilirubinogen prepared by chemical reduction in vitro was used since it is known that mesobilirubinogen prepared in this manner and urobilinogen formed by metabolic reduction in vivo behave the same chemically with the Ehrlich test system. Component 1 (the Ehrlich test system) comprising about one part by weight p-dimethylaminobenzaldehyde to 25 parts by weight of acid was added to the test sample in a proportion of about 15–25% by weight of the test sample. Full color development took place in about one minute. The solid reagent, Component 2, which liberates the solvent was added in a proportion of about 10–25% by weight of the mixture of the sample and the Ehrlich test system.

EXAMPLE I

Addition of p-dimethylaminobenzaldehyde and sulfosalicylic acid to a 2 mg. percent aqueous solution of mesobilirubinogen gave an immediate rose color. After full color development, almininum sec-butoxide was added and the mixture shaken. Rapid separation of a rose layer above the aqueous medium took place.

EXAMPLE II

Addition of p-dimethylaminobenzaldehyde and maleic acid to a 2 mg. percent aqueous solution of mesobilirubinogen gave a rose color. After full color development, aluminum n-hexyloxide was added and the mixture shaken. Slow but complete separation of a rose layer above the aqueous medium took place.

EXAMPLE III

Addition of p-dimethylaminobenzaldehyde and maleic acid to a 2 mg. percent aqueous solution of mesobilirubinogen gave slow development of a rose color. After full color development, aluminum n-heptyloxide was added and the mixture shaken. Slow but complete separation of a rose layer above the aqueous medium took place.

EXAMPLE IV

Addition of p-dimethylaminobenzaldehyde and sulfosalicylic acid and maleic acid to a 2 mg. percent aqueous solution of mesobilirubinogen produced an immediate rose color. After full color development, sodium nonanoate was added and the mixture shaken. Rapid separation of a rose layer above the aqueous medium took place.

EXAMPLE V

Addition of p-dimethylaminobenzaldehyde and sulfosalicylic acid and maleic acid to a 2 mg. percent aqueous solution of mesobilirubinogen produced an immediate rose color. After full color development, sodium isodecanoate was added and the mixture shaken. Rapid separation of a rose layer above the aqueous medium took place.

EXAMPLE VI

Addition of p-dimethylaminobenzaldehyde and sulfosalicylic acid and maleic acid to a 2 mg. percent aqueous solution of mesobilirubinogen produced an immediate rose color. After full color development, sodium octanoate was added and the mixture shaken. Rapid separation of a rose layer above the aqueous medium took place.

EXAMPLE VII

Addition of p-dimethylaminobenzaldehyde, sulfosalicylic acid, and maleic acid to a 2 mg. percent aqueous solution of mesobilirubinogen produced an immediate rose color. After full color development, sodium isooctanoate was added and the mixture shaken. Rapid separation of a rose layer above the aqueous medium took place.

EXAMPLE VIII

Addition of p-dimethylaminobenzaldehyde with oxalic acid to a 1 mg./100 ml. urinary solution of mesobilirubinogen gave an immediate rose color. After full color development, magnesium n-pentyloxide was added and the mixture shaken. Rapid separation of a rose layer above the urinary medium took place. Insoluble magnesium oxalate separated in the lower layer, and the contrast with the white precipitate emphasized the color in the upper layer.

EXAMPLE IX

Addition of p-dimethylaminobenzaldehyde with oxalic acid to a 1 mg./100 ml. urinary solution of mesobilirubinogen gave an immediate rose color. After full color development, magnesium n-hexyloxide was added and the mixutre shaken. Rapid separation of a rose layer above the urinary medium took place. Insoluble magnesium oxalate separated in the lower layer, and the contrast with the white precipitate emphasized the color in the upper layer.

EXAMPLE X

Addition of p-dimethylaminobenzaldehyde with oxalic acid to a 1 mg./100 ml. urinary solution of mesobilirubinogen gave an immediate rose color. After full color development, magnesium n-heptyloxide was added and the mixture shaken. Slow separation of a rose layer above the urinary medium took place. Insoluble magnesium oxalate separated in the lower layer, and the contrast with the white precipitate emphasized the color in the upper layer.

What is claimed is:
1. A method for the detection of urobilinogen and mesobilirubinogen in aqueous fluid containing the same which comprises adding to the said fluid, a reagent comprising: (1) para-di (lower alkyl) aminobenzaldehyde and a solid inert acid; and adding to the mixture obtained (2) a solid substance which decomposes on contact with the mixture obtained by adding (1) to the aqueous fluid to produce an inert solvent for any colored substance formed by reaction of the para-di (lower alkyl) aminobenzaldehyde with any urobilinogen present in the said liquid, said inert solvent being substantially immiscible with the aqueous fluid.

2. A method according to claim 1 in which the solid inert acid is sulfosalicylic acid, maleic acid or oxalic acid.

3. A method according to claim 1 in which the solid substance results in a solvent having a specific gravity less than 1.

4. A method according to claim 1 in which the solid substance which decomposes to produce an inert solvent is selected from the group consisting of magnesium and aluminum alkoxides of alkanols and alkali metal and ammonium salts of aliphatic acids, which alkanols and aliphatic acids are liquid at room temperature and immiscible or almost immiscible with water.

5. A method according to claim 4 in which the alkoxide is magnesium n-pentyloxide, magnesium n-hexyloxide, magnesium n-heptyloxide, aluminum n-hexyloxide or aluminum n-heptyloxide.

6. A method according to claim 4 in which the salt is sodium nonanoate, sodium isodecanoate, sodium octanoate, or sodium isooctanoate.

7. A method according to claim 1 in which the amount of para-di (lower alkyl) aminobenzaldehyde and acid reagent (1) added to the test liquid is 15 to 25% by weight of the aqueous liquid being tested and the amount of solid inert acid in the said reagent is 25 to 50 times the weight of the para-di (lower alkyl) aminobenzaldehyde.

8. A method according to claim 1 in which one-half to one minute elapses between addition of the para-di (lower alkyl) aminobenzaldehyde and acid to the test liquid and the addition thereto of the solid substance which decomposes to produce an inert solvent.

9. A method according to claim 1 in which the proportion of the solid substance which decomposes to produce an inert solvent, added to the mixture obtained by adding to the test liquid the para-di (lower alkyl) aminobenzaldehyde and the solid inert acid, is 10–25% by weight of the said mixture.

10. A method according to claim 1, in which the sample of aqueous liquid has a volume of 2 cc., 10 to 20 mg. of para-di (lower alkyl) aminobenzaldehyde and 25 to 50 times this weight of a solid inert acid are added thereto, and 300 to 500 mg. of the said solid substance which decomposes to produce an inert solvent are added to the mixture obtained.

11. A method according to claim 1 in which the para-di (lower alkyl) aminobenzaldehyde is para-dimethylaminobenzaldehyde.

12. A method for the detcetion of bilirubin which comprises reducing the bilirubin to mesobilirubinogen and then detecting the mesobilirubinogen by the method of claim 1.

13. A two-component composition for detecting urobilinogen and mesobilirubinogen in aqueous fluid comprising: (1) a mixture of para-di (lower alkyl) aminobenzaldehyde and a solid inert acid; and (2) a solid substance which decomposes on contact with the mixture obtained by adding (1) to the aqueous fluid to produce an inert solvent for any colored substance formed by reaction of the para-di (lower alkyl) aminobenzaldehyde with urobilinogen, said inert solvent being substantially immiscible with the aqueous fluid.

14. A composition according to claim 13, in which component (1) comprises, as the solid inert acid, sulfosalicylic acid, maleic acid or oxalic acid.

15. A composition according to claim 13, in which component (2) is selected from the group consisting of magnesium and aluminum alkoxides of alkanols, and alkali metal and ammonium salts of aliphatic acids, which alkanols and aliphatic acids are liquid at room temperature and substantially immiscible with water.

16. A composition according to claim 15, in which the alkoxide is magnesium n-pentyloxide, magnesium n-hexyloxide, magnesium n-heptyloxide, aluminum n-hexyloxide or aluminum n-heptyloxide.

17. A composition according to claim 15 in which the salt is sodium nonanoate, sodium isodecanoate, sodium octanoate, or sodium isooctanoate.

18. A composition according to claim 13 in which the weight of acid in component (1) is 25 to 50 times the weight of the para-di (lower alkyl) aminobenzaldehyde.

19. A composition according to claim 13 comprising in component (1) 10 to 20 mg. of para-di (lower alkyl)

aminobenzaldehyde and 25 to 50 times this weight of solid, inert acid, and, in component (2), 300 to 500 mg. of said solvent-producing solid substance.

20. A composition according to claim 13 in which the solid substance results in an inert solvent having a specific gravity of less than one.

References Cited

FOREIGN PATENTS 779,921   7/1957   Great Britain.

OTHER REFERENCES

Allport et al:—Colorimetric Analysis, vol. I, pp. 356–362.

MORRIS O. WOLK, *Primary Examiner*.

R. M. REESE, *Assistant Examiner*.

U.S. Cl. X.R.

23—253; 252—408